US007223463B2

(12) United States Patent
Arakida

(10) Patent No.: US 7,223,463 B2
(45) Date of Patent: May 29, 2007

(54) STRIPPING FOIL

(75) Inventor: Yoshio Arakida, Tsukuba (JP)

(73) Assignee: High Energy Accelerator Research Organization, Tsukuba (JP)

( * ) Notice: Subject to any disclaimer, the term of this patent is extended or adjusted under 35 U.S.C. 154(b) by 0 days.

(21) Appl. No.: 10/301,566

(22) Filed: Nov. 22, 2002

(65) Prior Publication Data

US 2003/0104207 A1 Jun. 5, 2003

(30) Foreign Application Priority Data

Nov. 30, 2001 (JP) ............................ 2001-366760

(51) Int. Cl.
*B32B 1/00* (2006.01)
*B32B 1/04* (2006.01)
*B32B 3/02* (2006.01)
*B32B 3/26* (2006.01)
*G21K 1/00* (2006.01)

(52) U.S. Cl. ...................... 428/219; 428/215; 428/408; 250/251

(58) Field of Classification Search ................ 428/408, 428/215, 219, 340, 216, 336; 250/251
See application file for complete search history.

(56) References Cited

U.S. PATENT DOCUMENTS 3,806,749 A * 4/1974 Yntema ....................... 313/15
3,866,132 A * 2/1975 Gorka, Jr. ................... 315/505
3,867,704 A * 2/1975 Gorka, Jr. ................... 315/505
5,073,913 A * 12/1991 Martin ......................... 378/34
5,440,133 A * 8/1995 Moyers et al. ........... 250/492.3
5,449,917 A * 9/1995 Clements ................. 250/492.3
5,659,223 A * 8/1997 Goodman .................... 315/39
5,874,811 A * 2/1999 Finlan et al. ............... 315/502
6,259,090 B1 * 7/2001 Roberts et al. ............. 250/251
6,462,348 B1 * 10/2002 Gelbart .................... 250/505.1

FOREIGN PATENT DOCUMENTS

JP 63-307397 12/1988
JP 10-17155 1/1998
JP 11-038195 A * 2/1999

OTHER PUBLICATIONS

V. Neufeldt, ed., "Webster's New World Dictionary of American English, Third College Edition," Webster's New World, New York, 1988 (no month), p. 341.*

(Continued)

*Primary Examiner*—Michael E. Lavilla
(74) *Attorney, Agent, or Firm*—Oliff & Berridge, PLC

(57) ABSTRACT

A foil is formed on a given substrate, then, peeled off of the substrate and floated on the water surface charged in a tank. The surface level of the water is decreased to contact the foil to a folding plate of a jug substrate and thus, fold the foil at the folding plate in two. The two surfaces of the foil opposing each other are laminated along a foil forming-supporting plate within a laminating region. The thus laminated foil is dried and annealed except the area in the vicinity of the foil forming-supporting plate, and then, cut along the folding plate, a foil acceptor and a supporting plate, to provide a stripping foil which can be supported by itself.

3 Claims, 11 Drawing Sheets

OTHER PUBLICATIONS

The Arizona Carbon Foil Company, "Mounting Technique," p. 1, no date.

Yamane, Isao et al., "A New Type of Stripping Carbon Foil for H-Charge-Exchange Injection into a Synchrotron," Nuclear Instruments and Methods in Physics Research A254 (1987), pp. 225-228, North Holland, Amsterdam, no month.

Borden, M. J. et al., "Long-life carbon-fiber-supported carbon stripper foils," Nuclear Instruments and Methods in Physics Research, A303, (1991), pp. 63-68, North-Holland, no month.

Liechtenstein, V. K. et al., "Preparation and evaluation of thin diamond-like carbon foils for heavy-ion tandem accelerators and time-of-flight spectrometers" Nuclear Instruments & Methods in Physics Research, Section—A: Accelerators, Spectrometers, Detectors and Associated Equipment, Elsevier, Amsterdam, NL, vol. 397, No. 1, Sep. 21, 1997, pp. 140-145, XP004093049.

Muggleton, A. H. F., Preparation of thin nuclear targets: Journal of Physics E (Scientific Instruments) UK, vol. 12, No. 9, Sep. 9, 1979, pp. 780-807, XP002375459.

Deamaley, G., :Preparation of thin self-supporting carbon films: Review of Scientific Instruments USA, vol. 31, No. 2, Feb. 2, 1960, pp. 197-198, XP002375460.

Y. Irie et al., "H-Painting Injection for the JHF 3-GeV Synchrotron" Proceedings of the 1998 European Particle Acceleration Conference, vol. 1, Jun. 22, 1998, pp. 2103-2105, XP002375458.

* cited by examiner

PRIOR ART

PRIOR ART

PRIOR ART

STRIPPING FOIL

BACKGROUND OF THE INVENTION

1. Field of the Invention

This invention relates to a stripping foil preferably usable for a charged particle accelerator, and a method and an apparatus for fabricating the stripping foil.

2. Description of the Prior Art

Conventionally, a stripping foil has been employed to extract from a negative ion beam introduced from an external ion source. With the stripping foil, an electron of the ion beam is scattered and ionized by the coulomb force from an atomic nucleus of the substance constituting the stripping foil, and thus, a desired charged particle such as a proton can be injected while the ion beam is penetrated through the stripping foil.

FIG. 1 is a schematic view showing a charged particle accelerator including a stripping foil, and FIG. 2 is a structural view showing the stripping foil. As is shown in FIG. 1, a negative ion beam is penetrated through a stripping foil to be converted into a given positive charged particle, which is introduced into a charged particle accelerator. Then, the charged particle interflows with another charged particle introduced previously and is accelerated with circulating orbit. On the other hand, as shown in FIG. 2, the stripping foil is formed very thin in a rectangular shape, so that it is required that the three side edges of the stripping foil without the side edge exposing to the circulating orbit are supported in order to maintain the stripping foil stably.

At present, in order to increase the number of charged particles to be accelerated in a charged particle accelerator, a phase space painting to introduce the charged particles dispersed vertically and laterally in a given degree has been planned. In this case, a large amount of charged particles are introduced and penetrated through the same stripping foil, the stripping foil may be deformed and damaged by excess heating or the like.

In this point of view, in order to decrease the number of charged particles to be introduced into the same stripping foil, such an attempt is made as to reduce the size of the stripping foil almost equal to the diameter of the charged particle or to change and shift the circulating orbits of the charged particles with a pulsed electromagnet.

With the stripping foil of which the three side edges are supported as shown in FIG. 2, all of the charged particles circulating their respective orbits are introduced into and penetrated through the stripping foil, so that the above-mentioned problems are posed on the stripping foil. In this point view, various stripping foil-supporting structure are proposed. Concretely, as shown in FIG. 3 is proposed a supporting structure where the two side edges of a stripping foil are supported, and as shown in FIG. 4, is proposed a supporting structure where a stripping foil is supported by thin wire set up vertically from a supporting frame.

With the corner foil structure shown in FIG. 3, the number of charged particles can be reduced almost half, compared with the three side edge supporting structure shown in FIG. 2. However, since the circulating orbits of the charged particles are always set on the stripping foil, the number of the charged particles are not reduced per unit area of the stripping foil. As a result, with the corner foil structure, the stripping foil is deformed and damaged in the same degree as with the three side edge supporting structure. With the wire supporting structure as shown in FIG. 4, since the wire are located in the circulating orbits of the charged particles, the charged particles are scattered by the wire, resulting in the damage of the wire.

SUMMERY OF THE INVENTION

It is an object of the present invention to provide a new stripping foil to mitigate the above-mentioned problems such as deformation and damage, and a method and an apparatus for fabricating the stripping foil.

In order to achieve the above object, this invention relates to a stripping foil comprising a rectangular outer shape and a curved surface shape, which is supported by itself.

FIG. 5 is a schematic view showing a stripping foil according to the present invention. As shown in FIG. 5, the stripping foil is formed rectangularly so that the surface is curved. Specifically, the stripping foil is a rectangular foil that has a curved surface, such that two non-adjacent side edges of the rectangular foil define a curve that supports the stripping foil. In this case, the stripping foil can be supported by itself if one curved side edge of the stripping foil is supported by a frame. In other words, since the stripping foil is formed so that the surface is curved, it can be supported by itself at the one curved side edge. In the present invention, since the supporting structure is simplified as shown in FIG. 5, the operationality of the stripping foil can be developed.

In a paint to introduce charged particles dispersed vertically and laterally in order to increase the number of charged particles to be accelerated in an accelerator, if the stripping foil as mentioned above is appropriately arranged and the size of the stripping foil is controlled, only the injected beam can be penetrated through the stripping foil and the circulating particles can not be almost penetrated. Therefore, the circulating particles can not be almost scattered at the stripping foil, and the stripping foil can not be almost deformed and damaged.

FIGS. 6 and 7 are cross sectional views of the stripping foil shown in FIG. 5, taken on line “A-A”. As mentioned above, although it is required that the surface of the stripping foil is curved, concretely, the surface may be waved as shown in FIG. 6 and curved as shown in FIG. 7.

For practical use, it is preferable that the weight per unit area of the stripping foil is set within a range of 5 $\mu g/cm^2$–1 $mg/cm^2$. In other words, it is preferable that the stripping foil is made of a material having a weight per unit area within the above-mentioned range. Concretely, the stripping foil may be made of carbon.

The fabricating method and the fabricating apparatus for the stripping foil will be described in detail, hereinafter.

DESCRIPTION OF THE PREFERRED EMBODIMENTS

Figure 1:
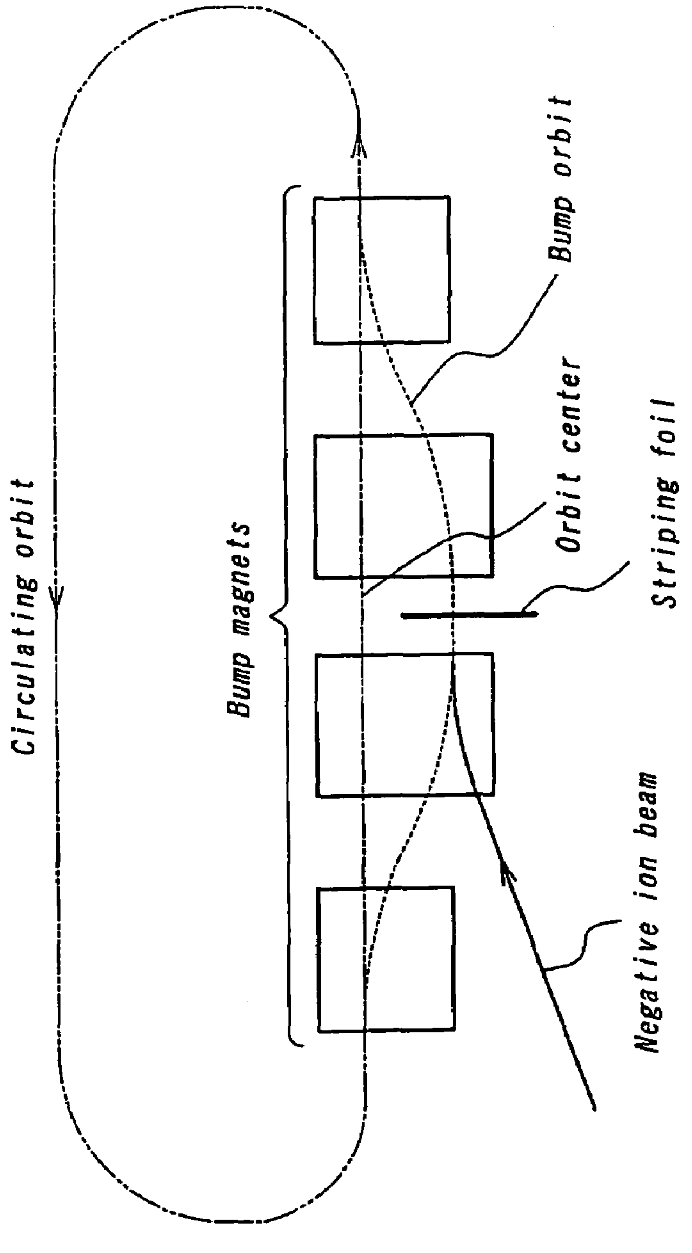
FIG. 1 is a schematic view showing a charged particle accelerator including a stripping foil.
Figure 2:
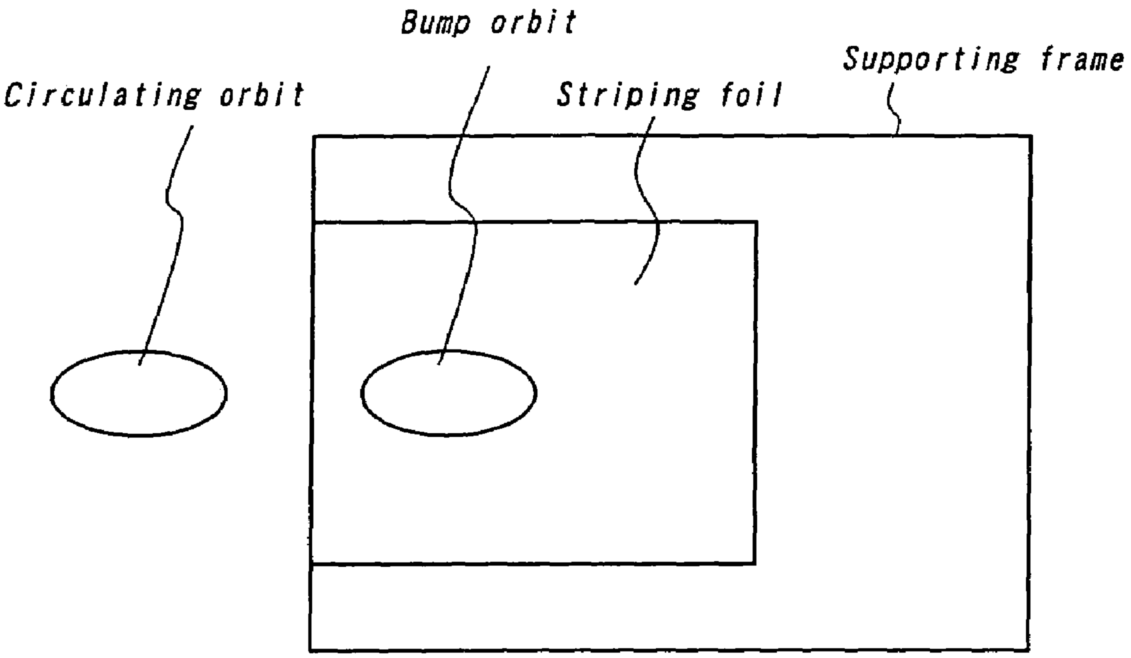
FIG. 2 is a structural view showing a conventional stripping foil.
Figure 3:
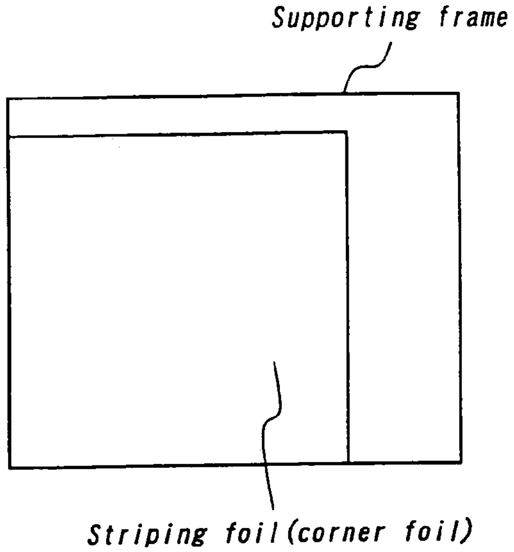
FIG. 3 PRIOR ART
FIG. 3 is a structural view showing another conventional stripping foil.
Figure 4:
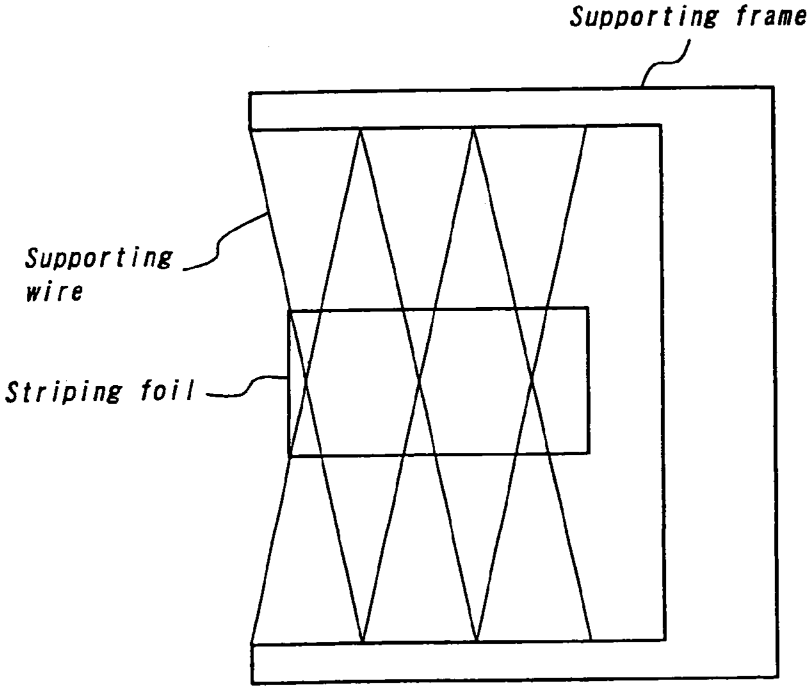
FIG. 4 is a structural view showing still another conventional stripping foil.
Figure 5:
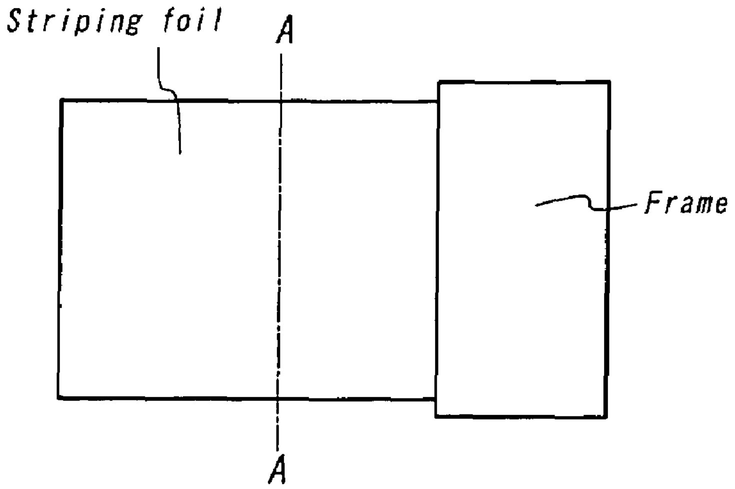
FIG. 5 is a structural view showing a stripping foil according to the present invention.
Figure 6:
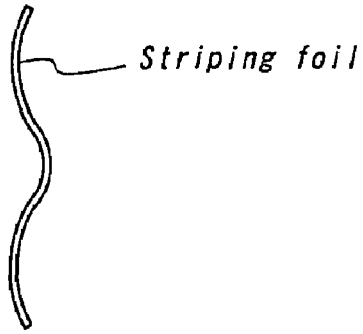
FIG. 6 is a cross sectional view of the stripping foil shown in FIG. 5, taken on line “A-A”

In the present invention, it is required as shown in FIG. 5 that the stripping foil is formed rectangularly so that the surface is curved and thus, the stripping foil can be supported by itself at the one side edge thereof. The stripping foil may be fabricated as follows, by utilizing the fabricating method and the fabricating apparatus of the present invention.

Figure 8:
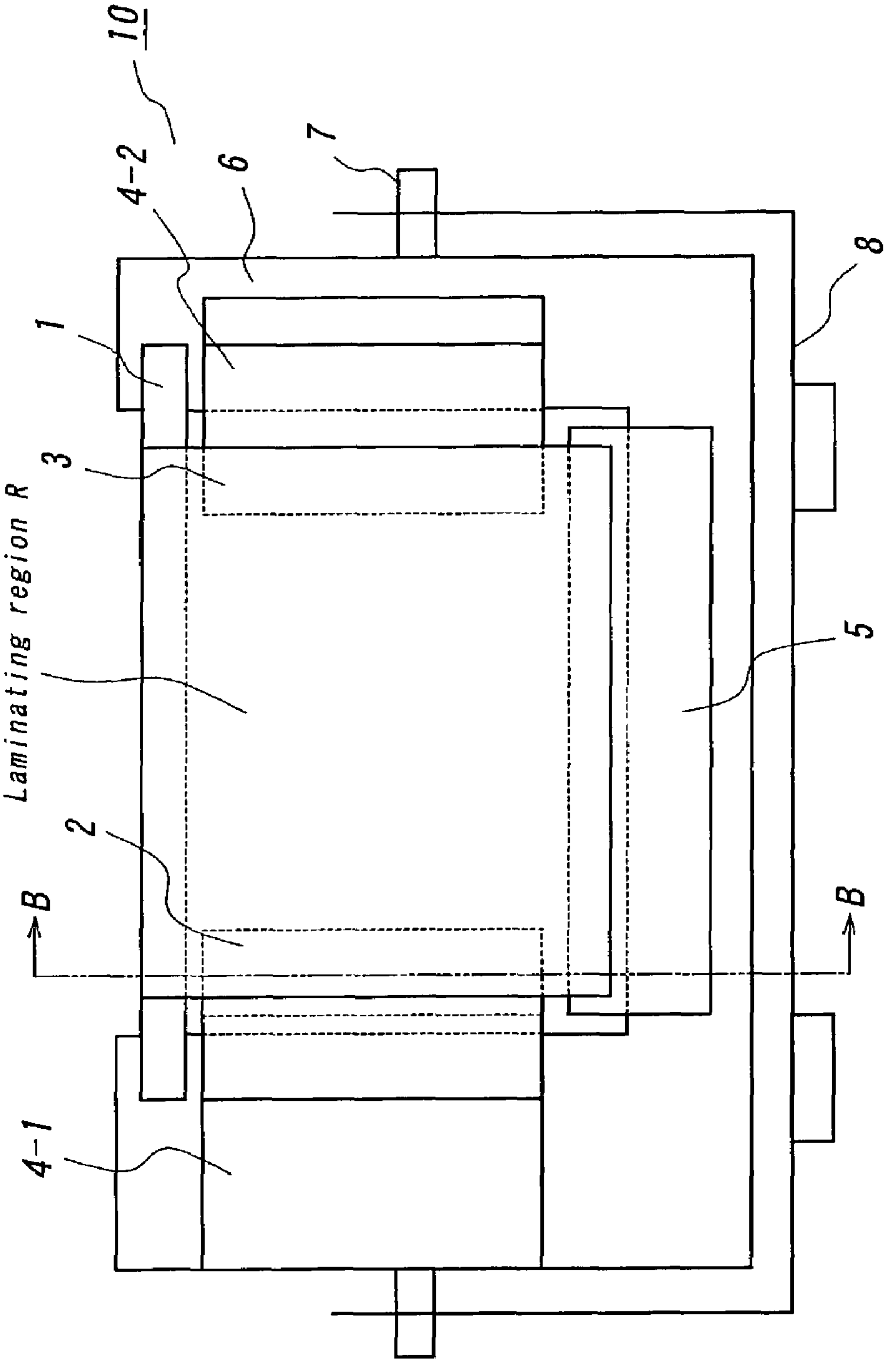
FIG. 8 is a structural view showing a jig substrate partially constituting a fabricating apparatus of stripping foil according to the present invention.
Figure 9:
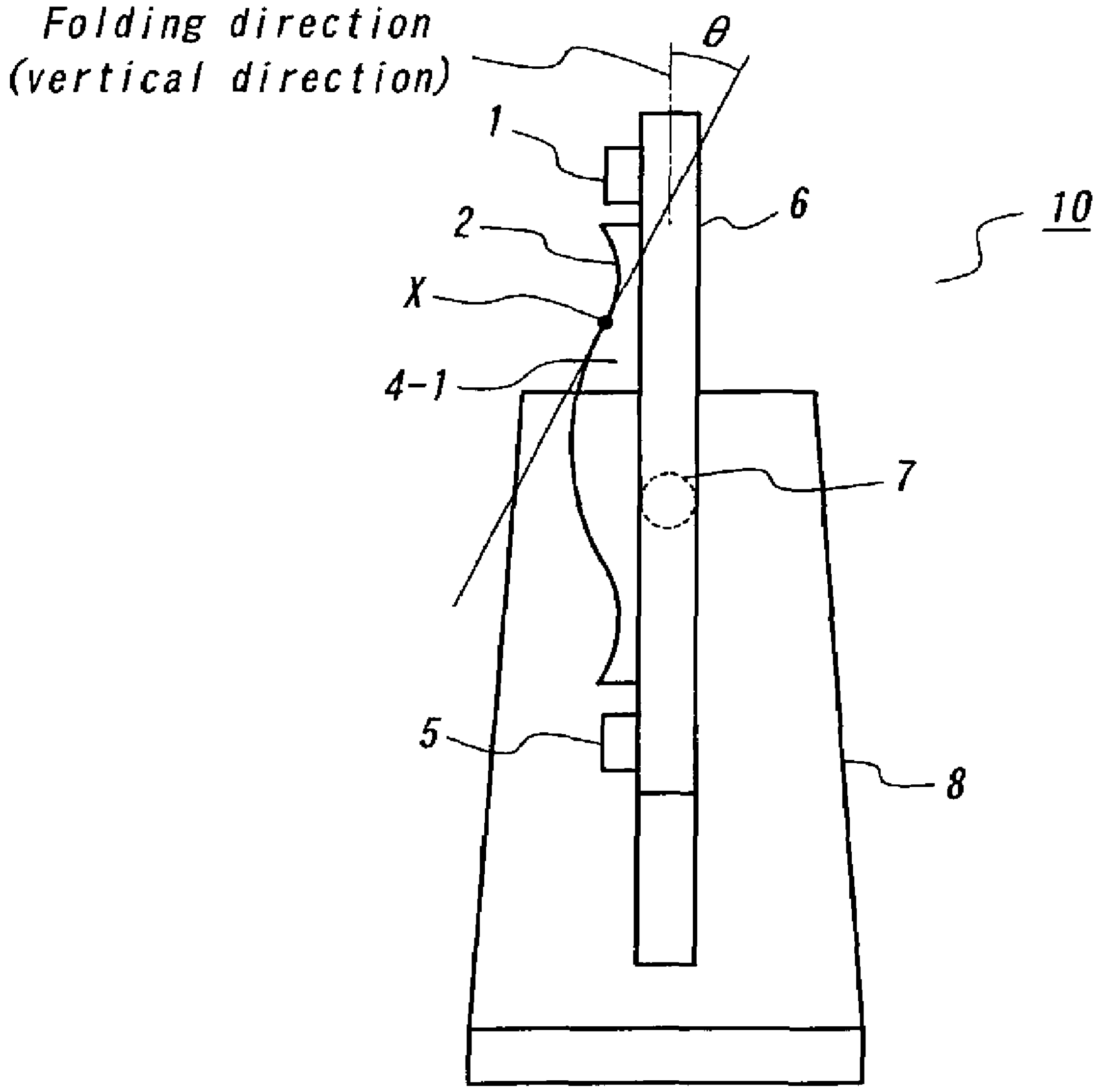
FIG. 9 is a cross sectional view of the jig substrate shown in FIG. 8, taken on line “B-B”

FIG. 8 is an elevational view showing a jig substrate of the fabricating apparatus, and FIG. 9 is a side view of the jig substrate shown in FIG. 8, taken on line "B-B". The jig substrate 10 includes the folding plate 1, the foil forming-supporting plate 2, the supporting plate 3 provided opposite to the supporting plate 2, the foil substrate 4-1 provided with joined to the supporting plate 2, the foil substrate 4-2 provided with joined to the supporting plate 3, and the foil acceptor 5. These constituent elements are supported by the supporting member 6 with the angle controlling shaft 7. The supporting member 6 is held by the frame 8.

Figure 10:
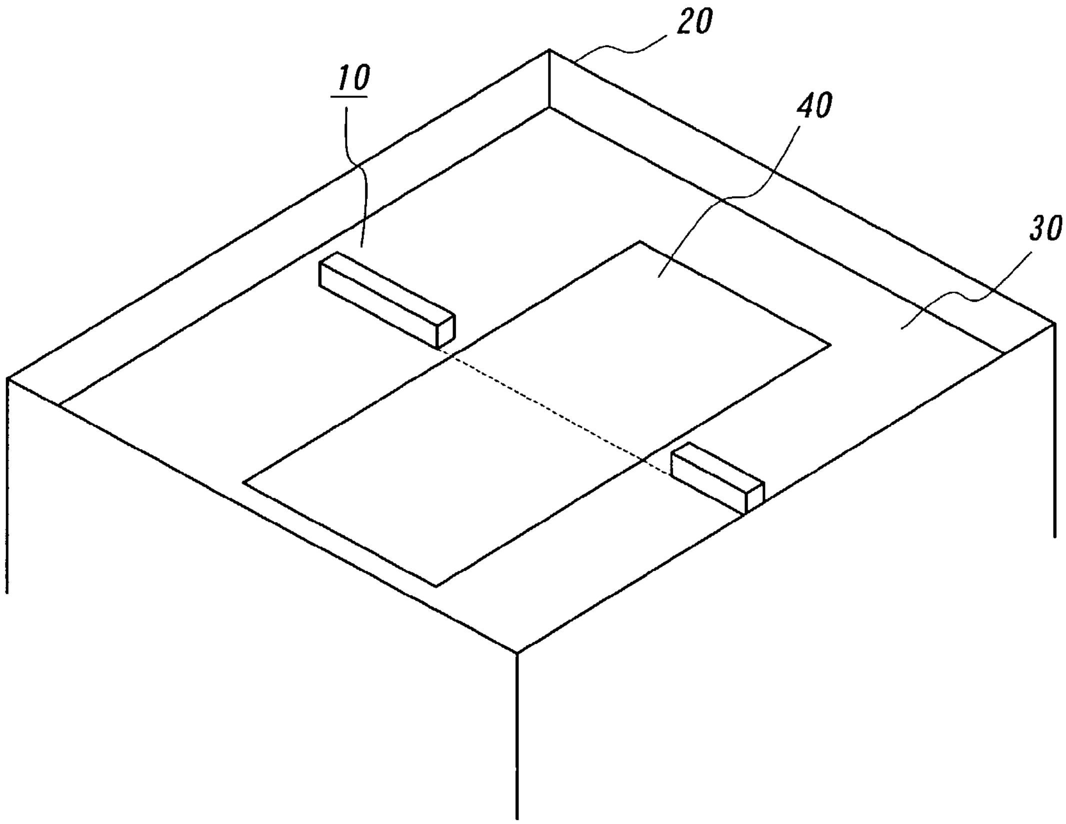
FIG. 10 is a process view showing a first step in a fabricating method of stripping foil according to the present invention.

FIGS. 10-14 are process views showing the fabricating method for the stripping foil of the present invention. First of all, the foil 40 is formed of carbon or the like in a predetermined thickness on a given substrate by means of deposition. Then, the substrate including the foil 40 thereon is sunk in the water 30 charged in the tank 20 from the edge portion, as shown in FIG. 10. The foil 40 is peeled off of the substrate by means of a peeling member and then, floated on the water surface. In the water 30, the jig substrate 10 shown in FIGS. 8 and 9 is sunk and provided.

Figure 11:
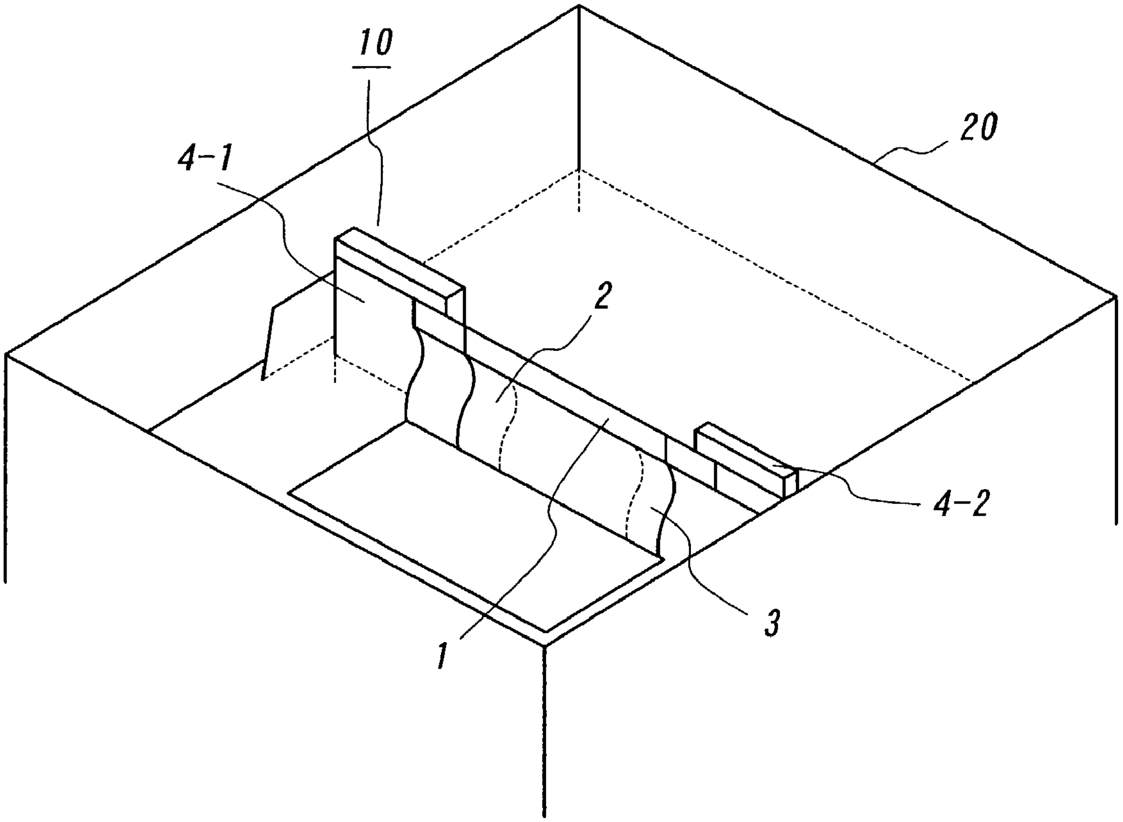
FIG. 11 is a process view showing a second step in the fabricating method of stripping foil.

Then, when the surface level of the water 30 is decreased, as shown in FIG. 11, the foil 40 is contacted with the folding plate 1 of the jig substrate 10, then, folded and deformed along the supporting plate 2 and 3. In this case, the two surfaces of the foil 40 opposing each other via the supporting plates 2 and 3 are laminated within the laminate region R at the same time when the foil 40 is folded. The thus obtained laminated foil 41 is deformed in a waving shape or a curving shape commensurate with the surface shapes of the supporting plates 2 and 3.

In the laminating process of the foil 40, it is desired that the tangent line of the surface of the supporting plate 2 is set almost parallel to the folding direction of the foil 40 by means of the angle controlling shaft 7 so that the two surfaces of the foil 40 is set almost parallel to the folding direction and thus, laminated vertically. In this case, since the horizontal components of surface tensions in the two surfaces of the foil 40 to be laminated is removed, the laminating operation can be performed precisely without deformation and damage.

For example, in the case that the two surfaces of the foil 40 is laminated at the point X of the supporting plate 2 of the jig substrate 10, the tangent line of the supporting plate 2 at the point X is inclined from the folding direction (vertical direction) by a angle of θ in FIG. 9. In this condition, therefore, the horizontal components of the surface tensions of the surfaces to be laminated is created. Accordingly, if the supporting member 6 is rotated leftward by the angle of θ, the tangent line is set almost parallel to the folding line, so that the laminating process can be performed precisely at the point X of the supporting plate 2 without the horizontal components of the surface tensions.

Even at another point of the supporting plate 2, it is desired that the laminating process is performed by controlling the angle controlling shaft 7 so that the laminating direction is set almost equal to the folding direction (vertical direction).

Figure 12:
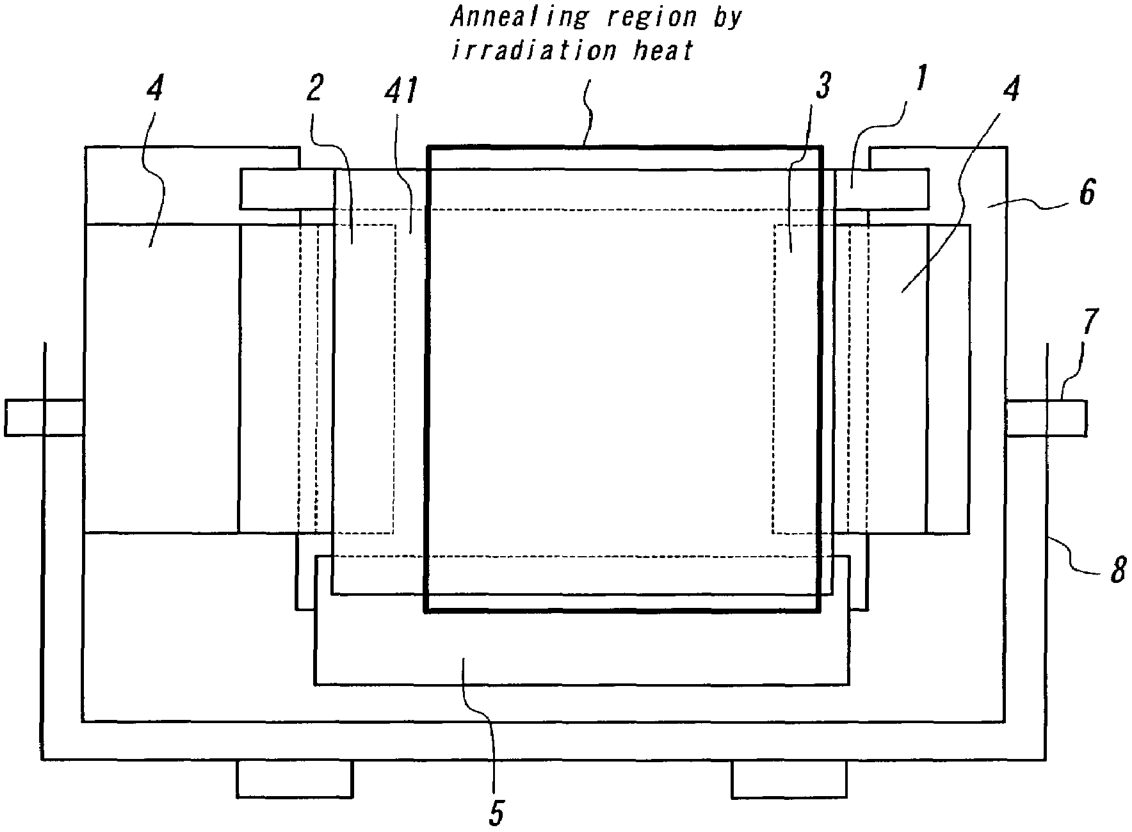
FIG. 12 is a process view showing a third step in the fabricating method of stripping foil.
Figure 13:
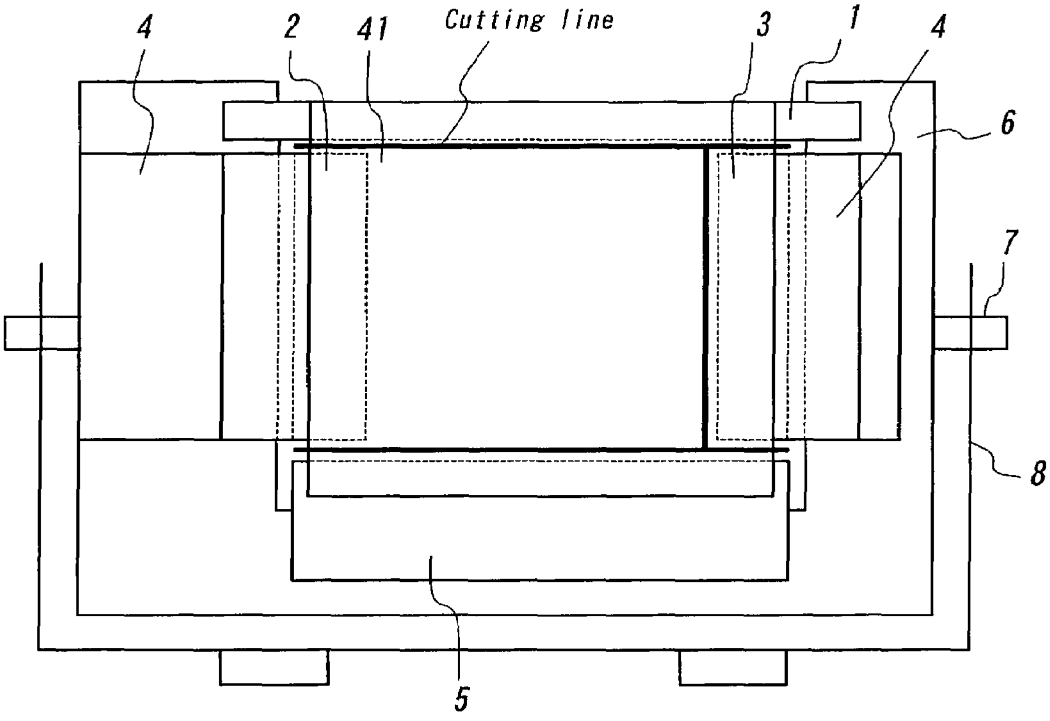
FIG. 13 is a process view showing a fourth step in the fabricating method of stripping foil.

The bottom of the laminated foil 41 is held at the foil acceptor 5, as shown in FIG. 12. Thereafter, the laminated foil 41 is dried and annealed by means of radiant heat except the area in the vicinity of the supporting plate 2. Then, as shown in FIG. 13, the laminated foil 41 is peeled off along the folding plate 1, the supporting plate 3 and the foil acceptor 5, and then, as shown in FIG. 14, A wave-shaped charge conversion foil 50 can be obtained.

Figure 14:
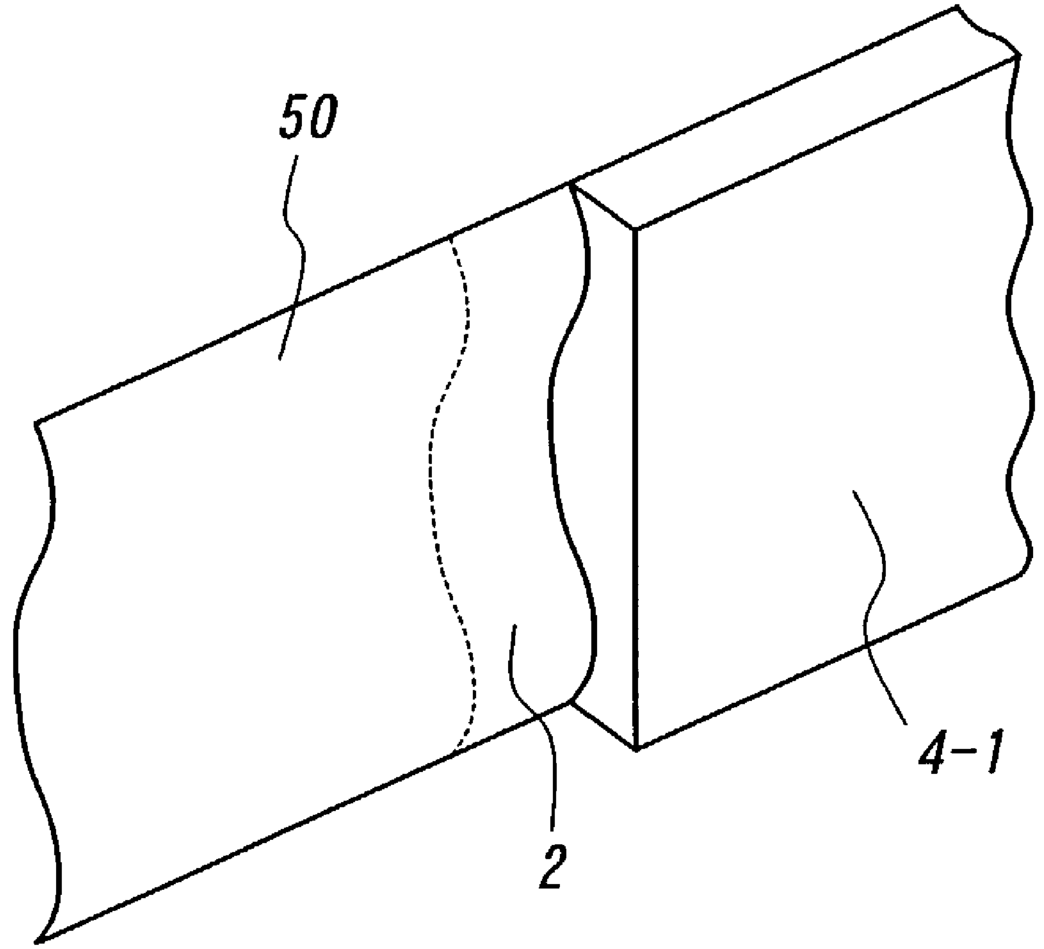
FIG. 14 is a process view showing a fifth step in the fabricating method of stripping foil.

As is apparent from FIG. 14, the supporting plate 2 is intervened between the laminated foil 41, and thus, the stripping foil 50, is supported by the foil substrate 4-1 via the foil substrate 2. In other words, the foil substrate serves as a supporting member for the stripping foil 50, so that the stripping foil 50 can be supported by itself at one side edge to which the foil substrate 4-1 is attached.

Although the present invention was described in detail with reference to the above examples, this invention is not limited to the above disclosure and every kind of variation and modification may be made without departing from the scope of the present invention.

Figure 7:
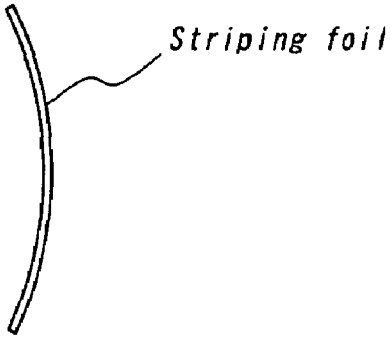
FIG. 7 is another cross sectional view of the stripping foil shown in FIG. 5, taken on line “A-A”

For example, although in the above embodiment relating to FIGS. 10-14, the wave-shaped stripping foil is fabricated, a curved stripping foil may be fabricated by adjusting the surface shape of the foil forming-supporting plate, as shown in FIG. 7. In addition, the foil 40 may be peeled off of the substrate directly by an experimenter or a given appliance.

As mentioned above, according to the present invention, a new stripping foil of which the size can be freely controlled. The stripping foil described herein can be used without a supporting frame that supports at least two edges of the stripping foil, but instead can be used with a supporting frame that supports only one curved edge of the stripping foil. and thus extreme operationality can be provided.

What is claimed is:

1. A structure comprising a supporting frame and a stripping foil, wherein:

the stripping foil comprises a thin rectangular foil;

two non-adjacent, opposite side edges of the rectangular foil are curved; and the stripping foil is supported on the supporting frame along one of the curved side edges such that the stripping foil supports itself on the supporting frame.

2. The structure as defined in claim 1, wherein the stripping foil has a weight per unit area of 5 $\mu g/cm^2$–1 $mg/cm^2$.

3. The structure as defined in claim 1, wherein the stripping foil can be used for converting a charge of an ion beam.

* * * * *